(12) United States Patent
Cuenca et al.

(10) Patent No.: US 12,424,939 B2
(45) Date of Patent: Sep. 23, 2025

(54) SWITCHED-MODE POWER SUPPLY

(71) Applicant: STMICROELECTRONICS (ROUSSET) SAS, Rousset (FR)

(72) Inventors: Michel Cuenca, Septemes les Vallons (FR); Sebastien Ortet, Beaurecueil (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 217 days.

(21) Appl. No.: 18/242,876

(22) Filed: Sep. 6, 2023

(65) Prior Publication Data

US 2023/0412076 A1 Dec. 21, 2023

Related U.S. Application Data

(62) Division of application No. 16/933,277, filed on Jul. 20, 2020, now Pat. No. 11,784,564.

(30) Foreign Application Priority Data

Jul. 25, 2019 (FR) ...................................... 1908469

(51) Int. Cl.
  *H02M 3/158* (2006.01)
  *H02M 1/00* (2006.01)
  *H02M 1/088* (2006.01)

(52) U.S. Cl.
  CPC .......... *H02M 3/158* (2013.01); *H02M 1/0022* (2021.05); *H02M 1/0032* (2021.05); *H02M 1/088* (2013.01)

(58) Field of Classification Search
  CPC .. H02M 3/158; H02M 1/0022; H02M 1/0032; H02M 1/088
  See application file for complete search history.

(56) References Cited

U.S. PATENT DOCUMENTS

| | | |
|---|---|---|
| 9,270,177 B1 | 2/2016 | Nakamura |
| 2010/0320991 A1 | 12/2010 | Yoshino |
| 2014/0071717 A1 | 3/2014 | Murata |
| 2014/0132236 A1 | 5/2014 | Darmawaskita et al. |
| 2015/0277460 A1* | 10/2015 | Liu .......................... G05F 1/56 323/280 |
| 2015/0280556 A1 | 10/2015 | Bari et al. |

(Continued)

FOREIGN PATENT DOCUMENTS

| | | |
|---|---|---|
| CN | 101212178 A | 7/2008 |
| CN | 102265234 A | 11/2011 |

(Continued)

OTHER PUBLICATIONS

INPI Search Report and Written Opinion for FR 1908469 dated Apr. 23, 2020 (10 pages).

(Continued)

*Primary Examiner* — Rafael O De Leon Domenech
(74) *Attorney, Agent, or Firm* — Crowe & Dunlevy LLC

(57) ABSTRACT

A switched-mode power supply includes a voltage ramp generation circuit that generates a voltage ramp signal. The voltage ramp generation circuit includes, selectively connected in parallel, at least three capacitors. The selective connection of the capacitors is made according to a value of an internal power supply voltage of the switched-mode power supply.

13 Claims, 3 Drawing Sheets

(56) References Cited

U.S. PATENT DOCUMENTS

| | | | |
|---|---|---|---|
| 2017/0182894 | A1 | 6/2017 | Yamaguchi et al. |
| 2019/0129868 | A1 | 5/2019 | Jiang et al. |
| 2019/0229612 | A1 | 7/2019 | Chen |
| 2022/0239215 | A1 | 7/2022 | Wachi et al. |
| 2022/0321009 | A1 | 10/2022 | Ortet et al. |

FOREIGN PATENT DOCUMENTS

| | | |
|---|---|---|
| CN | 106787626 A | 5/2017 |
| CN | 111277117 A | 6/2020 |
| CN | 212850271 U | 3/2021 |

OTHER PUBLICATIONS

First Office Action for family-related EP Appl. 20186613.4, action dated Jun. 3, 2022, 4 pgs.
CN First Office Action and Search Report for counterpart CN Appl. No. 202010721553.1, report dated Dec. 25, 2024, 9 pgs.

* cited by examiner

SWITCHED-MODE POWER SUPPLY

CROSS REFERENCE TO RELATED APPLICATIONS

This application is a divisional of U.S. patent application Ser. No. 16/933,277, filed Jul. 20, 2020, which claims the priority benefit of French Application for Patent No. 1908469, filed on Jul. 25, 2019, the contents of which are hereby incorporated by reference in their entireties to the maximum extent allowable by law.

TECHNICAL FIELD

The present disclosure generally concerns electronic systems and, in particular, circuits for powering such systems. The present disclosure more particularly concerns switched-mode power supplies (SMPS).

BACKGROUND

There exist several types of electric power supply circuits enabling to supply an electronic circuit, or device or system, or more generally a load, with a current/voltage pair. Linear power supplies and switched-mode power supplies are examples of power supply circuits.

A switched-mode power supply is a power supply circuit capable of delivering a DC voltage, generally from another DC voltage. Although switched-mode power supplies are generally DC/DC converters, certain switched-mode power supplies may comprise a rectifying stage enabling them to receive as an input an AC voltage, for example, the mains.

It would be desirable to at least partly improve certain aspects of known switched-mode power supplies.

There is a need in the art for higher-performance switched-mode power supplies.

There is a need in the art for switched-mode power supplies consuming less power.

SUMMARY

An embodiment overcomes all or part of the disadvantages of known switched-mode power supplies.

An embodiment provides a switched-mode power supply comprising a voltage ramp generation circuit comprising, in parallel, at least three capacitors selectable according to the value of an internal power supply voltage of the switched-mode power supply.

According to an embodiment, the current ramp generation circuit is implemented during a low-power operating mode of the switched-mode power supply.

According to an embodiment, the low-power operating mode is an operating mode in pulse frequency modulation.

According to an embodiment, the current ramp generation circuit is implemented during a high-power operating phase of the switched-mode power supply.

According to an embodiment, the high-power operating mode is an operating mode in pulse width modulation.

According to an embodiment, the internal power supply voltage has an average value equal to an input voltage of the switched-mode power supply.

According to an embodiment, said at least three selectable capacitors are selectable via switches.

Another embodiment provides an operating method of a switched-mode power supply wherein the slope of a voltage ramp delivered by a voltage ramp generation circuit is modified according to the value of an internal power supply voltage of the switched-mode power supply.

According to an embodiment, said slope is increased when the internal power supply voltage is decreased.

According to an embodiment, said slope is decreased when the internal power supply voltage is increased.

According to an embodiment, said slope is modified by adjusting a capacitance of said voltage ramp generation circuit.

According to an embodiment, the method is used during a low-power mode of the switched-mode power supply.

According to an embodiment, the method is used during a high-power mode of the switched-mode power supply.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
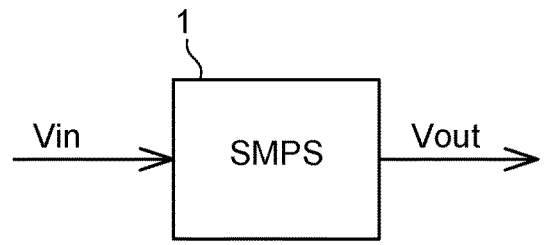
FIG. 1 schematically shows in the form of blocks a switched-mode power supply.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "approximately", "substantially", and "in the order of" are used herein to designate a tolerance of plus or minus 10%, preferably of plus or minus 5%, of the value in question.

FIG. 1 very schematically shows in the form of blocks a switched-mode power supply 1 (SMPS).

A switched-mode power supply (SMPS) 1 is a power supply circuit capable of supplying, from a DC voltage Vin, a new DC voltage Vout. Switched-mode power supply 1 is capable of powering a load coupled to its output, that is, receiving voltage Vout. To achieve this, the switched-mode power supply has a plurality of different operating modes according to the value of input voltage to be converted. Switched-mode power supply 1, for example, comprises at least two operating modes.

A first operating mode is a low-power operating mode, or low power consumption mode, where the switched-mode power supply operates in pulse frequency modulation (PFM). This operating mode is used when a load connected to the output of switched-mode power supply 1 requires a low current, for example, a current below 30 mA. This operating mode is described in relation with FIG. 2.

A second operating mode is a high-consumption or high-power operating mode, where the switched-mode power supply operates in pulse width modulation (PWM). Such an operating mode is used when the load connected to the output of switched-mode power supply 1 requires a high current, for example, a current above 30 mA. This operating mode is described in relation with FIG. 3.

Switched-mode power supply 1 may further comprise other operating modes, such as for example a forced conduction or bypass operating mode.

Figure 2:
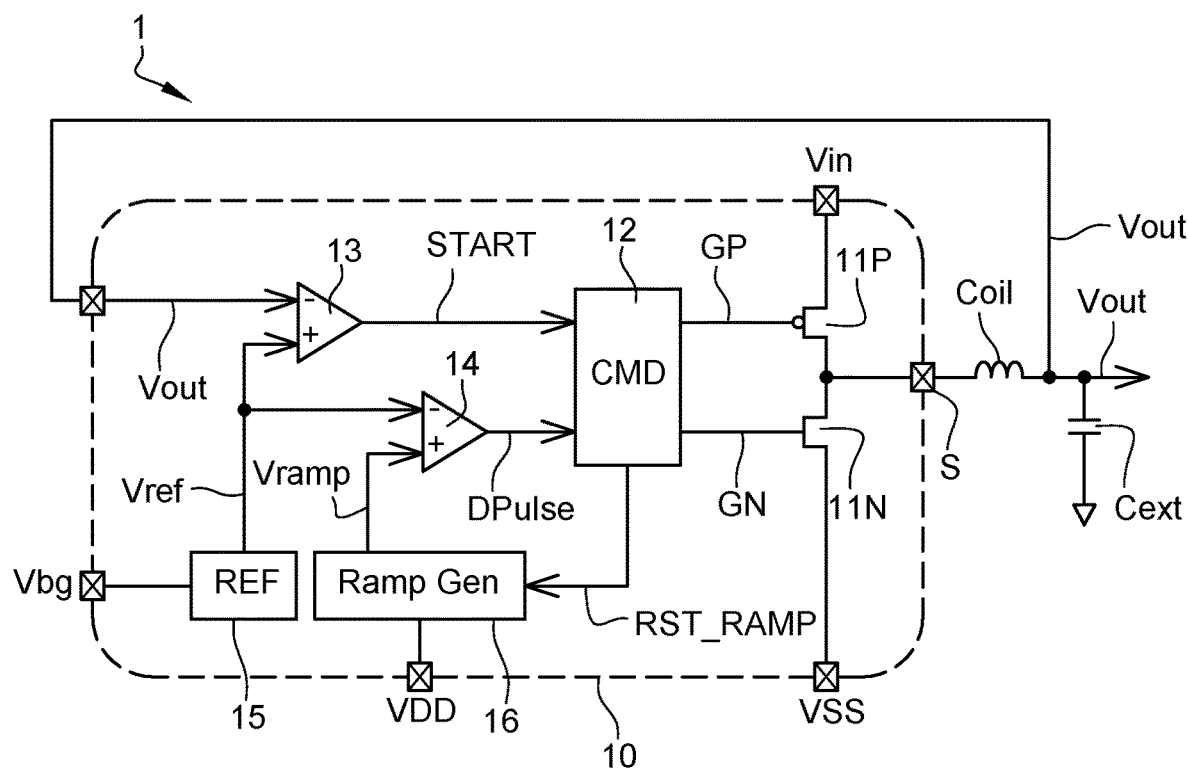
FIG. 2 schematically shows in the form of blocks an embodiment of a portion of a switched-mode power supply during a low-power phase.

FIG. 2 schematically shows in the form of blocks a portion of switched-mode power supply 1 comprising an inductance Coil, a capacitor Cext, and a control circuit architecture when switched-mode power supply 1 is in a low-power operating mode.

Inductance Coil has one of its terminals coupled, preferably connected, to an output node of circuit architecture 10. The other terminal of inductance Coil delivers output voltage Vout of switched-mode power supply 1.

Capacitor Cext has an electrode coupled, preferably connected, to the terminal of inductance Coil delivering output voltage Vout. The other electrode of capacitor Cext is coupled, preferably connected, to a reference node, for example, a node receiving the ground.

Control circuit architecture 10 comprises an N-channel MOS transistor 11N and a P-channel MOS transistor 11P. Transistors 11P and 11N are series-connected. More particularly, the drain of transistor 11N is coupled, preferably connected, to the drain of transistor 11P. The source of transistor 11P is coupled, preferably connected, to a terminal receiving input voltage Vin. The source of transistor 11N is coupled, preferably connected, to a terminal receiving a low power supply voltage VSS. Low power supply voltage VSS is, for example, a reference voltage such as the ground. Output node S of circuit architecture 10 is defined by the junction point of transistors 11N and 11P. In other words, node S is coupled, preferably connected, to the drains of transistors 11N and 11P.

Circuit architecture 10 further comprises a state machine (CMD) 12 configured to deliver signals GP and GN enabling to control the gates of transistors 11P and 11N. State machine 12 further delivers a reset signal RST_RAMP. State machine 12 receives, as an input, signals START and DPulse.

Circuit architecture 10 further comprises a comparator circuit 13 configured to compare output voltage Vout of switched-mode power supply 1 with a reference voltage Vref. Comparator circuit 13 outputs signal START.

Circuit architecture 10 further comprises a comparator circuit 14 configured to compare reference voltage Vref with a ramp voltage Vramp. Comparator circuit 14 outputs signal DPulse.

Circuit architecture 10 further comprises a circuit 15 for generating reference voltage Vref. Circuit 15 receives as an input a voltage Vbg and outputs voltage Vref. Voltage Vbg is a general reference voltage of switched-mode power supply 1, which varies little according to temperature. Voltage Vbg is for example a bandgap voltage.

Circuit architecture 10 further comprises a circuit for generating a voltage ramp or ramp generator circuit 16. Circuit 16 receives, as an input, signal RST_RAMP and a power supply voltage VDD internal to switched-mode power supply 1. Internal power supply voltage VDD has the same average value as input voltage Vin, but is generally less noisy. According to a variation, internal power supply voltage VDD is equal to input voltage Vin. Circuit 16 outputs voltage Vramp. Circuit 16 is detailed in relation with FIG. 4.

Switched-mode power supply 1 operates as follows in the low-power mode.

During the low-power mode, capacitor Cext is periodically charged and discharged with a set quantity of power. The frequency of charge and discharge of capacitor Cext, or the duration of a charge and discharge period, is variable and is controlled by signal START. The quantity of power sent to capacitor Cext is controlled by signal DPulse. A charge and discharge period comprises a first phase of charging the capacitor Cext and a second phase of discharging the capacitor Cext. During a charge phase, transistor 11P is on and transistor 11N is off. During a discharge phase, transistor 11N is on and transistor 11P is off.

More particularly, capacitor Cext discharges due to a load connected at the output of switched-mode power supply 1, consuming power. As soon as the power stored by capacitor Cext falls below a minimum threshold, signal START controls transistor 11P to the on state and transistor 11N to the off state, to charge capacitor Cext with input voltage Vin via inductance Coil. More particularly still, signal START detects that the capacitor no longer stores enough power as soon as output voltage Vout is smaller than reference voltage Vref. Voltage Vref corresponds to the voltage across capacitor Cext when it stores a minimum power threshold. The more the output load of switched-mode power supply 1 consumes power, the higher the frequency of the frequency pulses sent to the capacitor will be.

To set the quantity of power sent to capacitor Cext at each new charge period, signal DPulse defines the duration TON for which transistor 11P is on during a charge phase.

Figure 3:
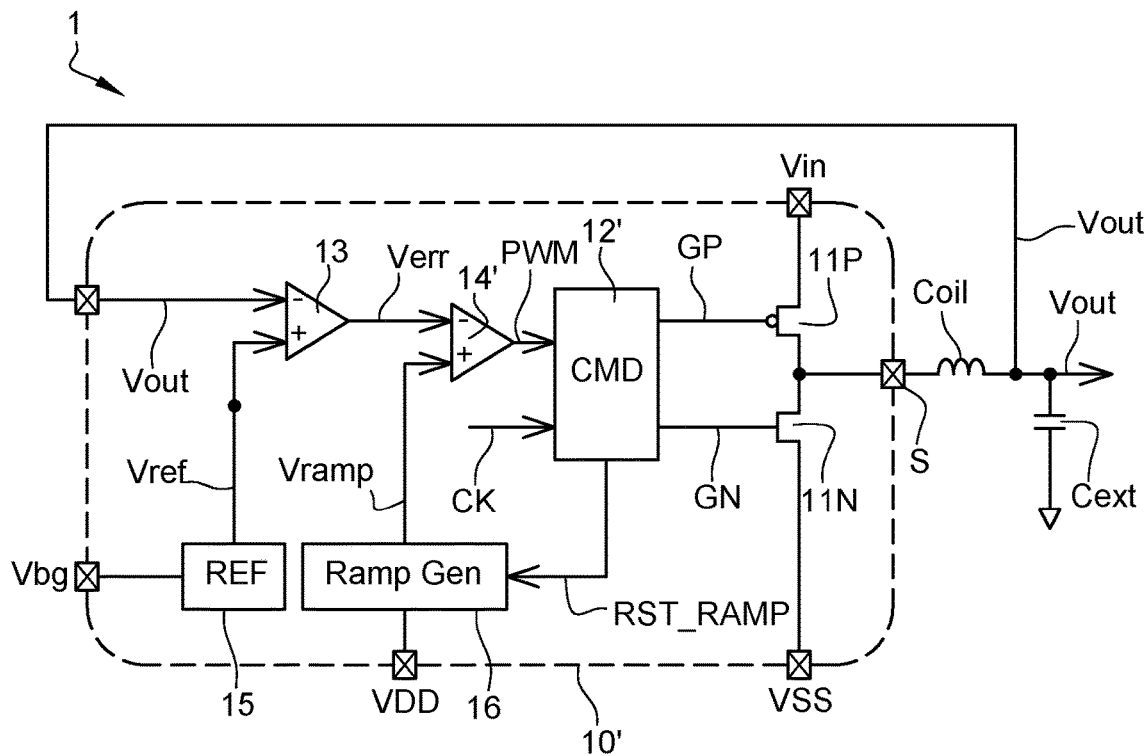
FIG. 3 schematically shows in the form of blocks an embodiment of a portion of a switched-mode power supply during a high-power phase.

FIG. 3 schematically shows in the form of blocks a portion of switched-mode power supply 1 comprising inductance Coil, a capacitor Cext, and a control circuit architecture 10' of switched-mode power supply 1 when it operates in a high-power operating mode.

Circuit architecture 10' comprises elements common with the circuit architecture described in relation with FIG. 2. These elements will not be detailed again hereafter.

In circuit architecture 10', control signals GP and GN and signal RST_RAMP are generated by a state machine 12' (CMD) receiving as an input a PWM signal and a clock signal CK.

In circuit architecture 10', comparator circuit 13 delivers as an output an error voltage Verr to an input of a comparator circuit 14' (replacing comparator circuit 14). Comparator circuit 14' receives on a second input voltage Vramp delivered by ramp generator circuit 16. Comparator circuit 14' outputs the PWM signal.

An operating mode of switched-mode power supply 1 during a high power mode is the following.

During a high power mode, capacitor Cext is periodically charged and discharged with a variable quantity of power. The duration of a period comprising a charge phase and a discharge phase is constant and is set by clock signal CK.

During a charge phase, transistor 11P is on and transistor 11N is off. During a discharge phase, transistor 11N is on and transistor 11P is off. The durations of a charge phase and of a discharge phase are variable and controlled by the PWM signal. In other words, the duty cycle of the turning off and of the turning on of the transistors is adjusted by the PWM signal.

The PWM signal is obtained by comparing error voltage Verr, representing the difference between output voltage Vout and reference voltage Vref, with the voltage Vramp delivered by circuit 16. As soon as the error is too high, the PWM signal commands a phase of charging the capacitor Cext.

Figure 4:
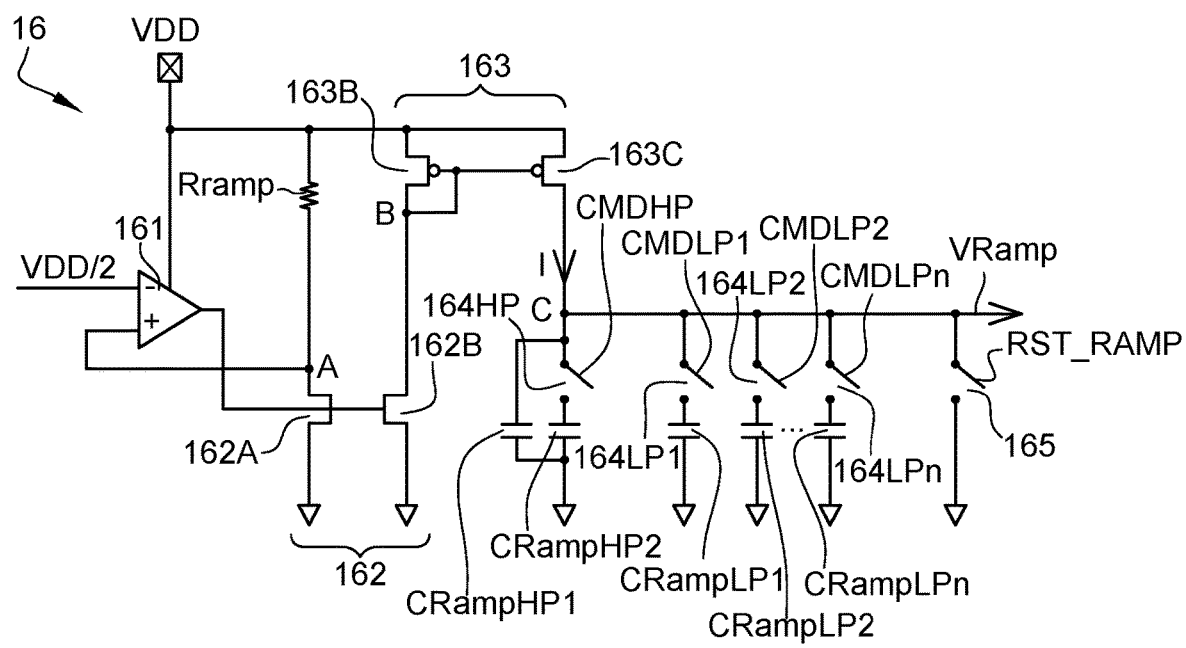
FIG. 4 schematically shows in the form of blocks an embodiment of a ramp generator circuit of the portions of the switched-mode power supply of FIGS. 2 and 3.

FIG. 4 shows in further detail the circuit of generation of a voltage ramp 16 of architectures 10 and 10' described in relation with FIGS. 2 and 3.

Circuit 16 comprises a resistor Rramp receiving, on one of its terminals, internal power supply voltage VDD. The second terminal of resistor Rramp is coupled, preferably connected, to a node A. Resistor Rramp has a resistance value noted Rramp.

Circuit 16 further comprises an operational amplifier 161 having a first input (+) coupled, preferably connected, to node A, and a second input (−) receiving power supply voltage VDD divided by two (VVD/2). Operational amplifier 161 is powered with internal power supply voltage VDD. An output of operational amplifier 161 controls a first current-mirror circuit 162 of circuit 16.

Circuit 162 comprises two N-type MOS transistors 162A and 162B having their gates coupled, preferably connected, to each other and to the output of operational amplifier 161. Transistor 162A has its drain coupled, preferably connected, to node A, and has its source coupled, preferably connected, to a reference node, for example, a node receiving the ground. Transistor 162B has its drain coupled, preferably connected, to a node B, and its source coupled, preferably connected, to a reference node, for example, a node receiving the ground.

Circuit 16 further comprises a second current mirror circuit 163. Circuit 163 comprises two P-type MOS transistors 163B and 163C. The gates of transistors 163B and 163C are coupled, preferably connected, to each other and to node B. The sources of transistors 163B and 163C are coupled, preferably connected, to each other and receive internal power supply voltage VDD. The drain of transistor 163B is coupled, preferably connected, to node B. The drain of transistor 163C is coupled, preferably connected, to a node C delivering voltage Vramp. In other words, node C is an output node of circuit 16.

Circuit 16 further comprises a capacitor CrampHP1. A first electrode of capacitor CampHP1 is coupled, preferably connected, to node C and a second electrode of capacitor CampHP1 is coupled, preferably connected, to a reference node, for example, a node receiving the ground.

Circuit 16 further comprises a capacitor CrampHP2 selectable by a switch 164HP. A first electrode of capacitor CampHP2 is coupled, preferably connected, to a terminal of switch 164HP, and a second electrode of capacitor CampHP2 is coupled, preferably connected, to a reference node, for example, a node receiving the ground. A second terminal of switch 164HP is coupled, preferably connected, to node C. Switch 164HP is controlled by a signal CMDHP.

Circuit 16 further comprises n capacitors CrampLP1, CrampLP2, . . . , CrampLPn respectively selectable by switches 164LP1, 164LP2, . . . , 164LPn, where n is preferably an integer number in the range from 2 to 8. Each capacitor CrampLPi, with i varying from 1 to n, has a first electrode coupled, preferably connected, to a terminal of the switch 164LPi associated therewith, and has a second electrode coupled, preferably connected, to a reference node, for example, a node receiving the ground. A second terminal of switch 164LPi is coupled, preferably connected, to node C. Switch 164LPi is controlled by a signal CMDLPi.

Circuit 16 further comprises a switch 165 coupling node C and the reference node, for example, a node receiving the ground. Switch 165 is controlled by signal RST_RAMP.

Circuit 16 operates as follows. Capacitor CrampHP1 and the selected capacitor(s) CrampHP2, CrampLP1, CrampLP2, . . . , CrampLPn are progressively charged by a current I. Voltage Vramp varies according to a voltage ramp. The larger the general capacitance Cramp of capacitor CrampHP1 and of the selected capacitors CrampHP2, CrampLP1, CrampLP2, . . . , CrampLPn, the smaller the slope of the ramp followed by Vramp. The turning off of switch 165 enables to reset voltage Vramp.

Signal DPulse described in relation with FIG. 2 is generated as follows. At each beginning of a charge period of capacitor Cext, that is, at the turning off of transistor 11P, voltage Vramp is at zero. During a charge period, voltage Vramp varies according to a ramp. Comparator circuit 14 compares voltage Vramp with reference voltage Vref. As long as voltage Vramp is smaller than reference voltage Vref, signal DPulse controls the turning on of transistor 11P and the turning off of transistor 11N, and capacitor Cext charges. As soon as voltage Vramp exceeds voltage Vref, signal Dpulse controls transistor 11P to the off state and transistor 11N to the on state, and capacitor Cext discharges. Thus, duration TON of charge of capacitor Cext is defined by the duration necessary for voltage Vramp to exceed voltage Vref. Duration TON is defined by the following formula:

$$TON = Rramp * Cramp * \frac{Vout}{VDD}$$

Figure 5:
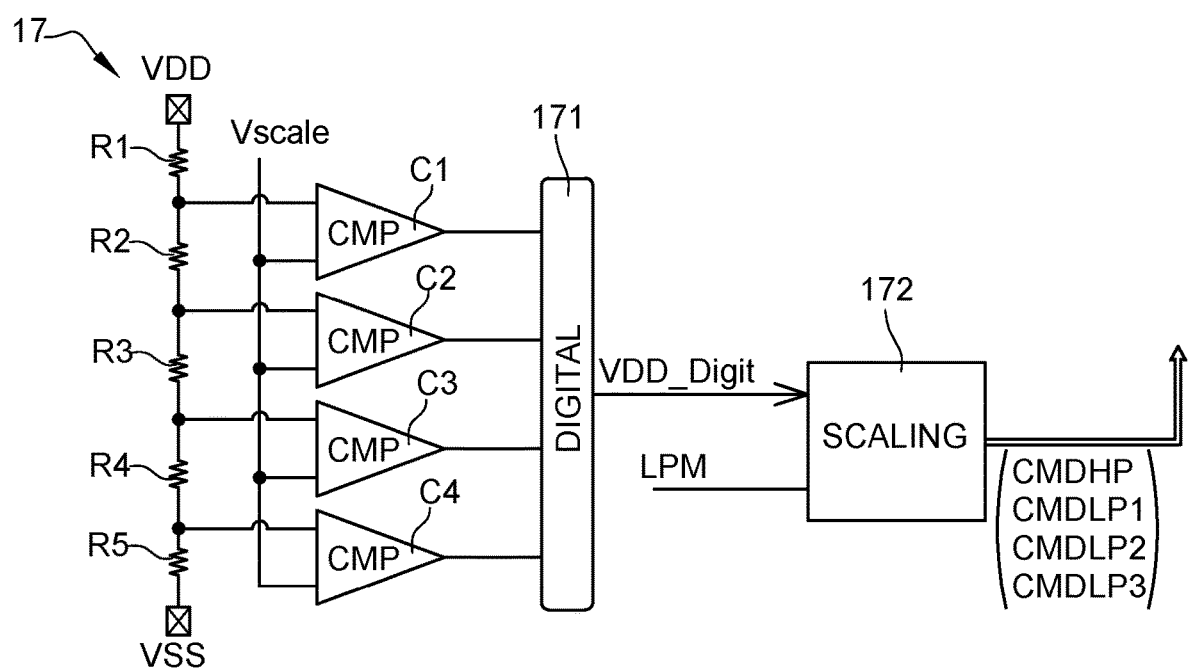
FIG. 5 schematically shows in the form of blocks an example of a circuit for controlling the circuit of FIG. 4.

Signals CMDHP, CMDLP1 to CMDLPn are generated by a control circuit 17 (not shown in FIG. 4), an embodiment of which is described in relation with FIG. 5. The states of signals CMDHP, CMDLP1 to CMDLPn depend on the value of internal power supply voltage VDD. More particularly, voltage VDD may belong to a plurality of different ranges of values, and according to its value, certain signals CMDHP, CMDLP1 to CMDLPn are activated and others are not. In particular, general capacitance Cramp is increased when power supply voltage VDD decreases.

An advantage of the use of a voltage ramp generation circuit of the type of circuit 16 is that the slope of the voltage ramp that it outputs can be modulated according to a set point voltage, here, internal power supply voltage VDD.

An advantage of the use of a circuit 16 during a low-power mode of switched-mode power supply 1 is that it enables to decrease power losses in inductance Coil. Indeed, during a period of charge of capacitor Cext, inductance Coil sees a voltage equal to the difference between output voltage Vout and input voltage Vin, which has the same average value as internal power supply voltage VDD. Thus, during a charge period, the current Imax entering inductance Coil is equal to:

$$Imax = TON * \frac{VDD - Vout}{L} = 2 * Rramp * Cramp * \left(\frac{Vout}{VDD}\right)\left(\frac{VDD - Vout}{L}\right)$$

where L is the value of inductance Coil.

Current Imax depends on voltage VDD, and a method to decrease it and to limit power losses is to gradually decrease capacitance Cramp when voltage VDD is increased. Thus, losses are limited.

FIG. 5 shows an example of a control circuit 17, or a circuit for generating control signals CMDHP, and CMDLP1, . . . , CMDLPn described in relation with FIG. 3. The circuit 17 described herein is capable of being coupled with a circuit 16 of FIG. 3 comprising three capacitors CrampLP1 to CrampLP3.

Circuit 17 comprises, between a node receiving voltage VDD and a node receiving voltage VS S, series-connected resistors R1 to R5. As an example, resistors R1 to R5 all have equal resistance values.

Circuit 17 further comprises four comparator circuits C1 to C4 (CMP). Each comparator circuit receives on one of its inputs a comparison voltage Vscale. Comparator circuits C1 to C4 receive on a second input the voltage present on a junction point of two resistors R1 to R5. More specifically: circuit C1 receives the voltage of the junction point of resistors R1 and R2; circuit C2 receives the voltage of the junction point of resistors R2 and R3; circuit C3 receives the voltage of the junction point of resistors R3 and R4; and circuit C4 receives the voltage of the junction point of resistors R4 and R5.

The outputs of circuits C1 to C4 are sent into a compilation circuit 171 (DIGITAL) enabling to determine the interval of values containing the value of voltage VDD. The compilation circuit outputs a digital signal VDD DIGIT comprising the information relative to the range including voltage VDD.

Circuit 17 further comprises a decoding circuit 172 (SCALING) configured to output control signals CMDHP, and CMDLP1, CMDLP2, and CMDLP3. Circuit 172 receives, as an input, signal VDD DIGIT and a signal LPM signifying the activation of a low-power mode of switched-mode power supply 1. Circuit 17 enables to set the value of general capacitance Cramp described in relation with FIG. 4.

Various embodiments and variations have been described. It will be understood by those skilled in the art that certain features of these various embodiments and variations may be combined, and other variations will occur to those skilled in the art.

Finally, the practical implementation of the described embodiments and variations is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method of operating a switched-mode power supply, comprising:
   modifying a slope of a voltage ramp delivered by a voltage ramp generation circuit;
   wherein modifying comprises responding to change in a value of a supply voltage of the switched-mode power supply with an inverse change in the slope of the voltage ramp.

2. The method of claim 1, wherein the slope of the voltage ramp is set by a capacitance, and wherein modifying comprises adjusting the capacitance in response to change in the supply voltage.

3. The method of claim 2, wherein said capacitance is provided by a plurality of selectable capacitors, and wherein adjusting said capacitance comprises selecting connection of one or more capacitors of said plurality of selectable capacitors in response to the value of the supply voltage.

4. The method of claim 3, wherein selecting comprises selecting parallel connection of one or more capacitors of said plurality of selectable capacitors.

5. The method of claim 3, further comprising:
   sensing the supply voltage for the switched-mode power supply;
   comparing the sensed supply voltage to a reference; and
   generating a control signal to adjust the capacitance based on the comparison.

6. The method of claim 1, wherein modifying is performed when operating the switched-mode power supply in pulse-frequency modulation.

7. The method of claim 1, wherein modifying is performed when operating the switched-mode power supply in pulse-width modulation.

8. The method of claim 1, further comprising detecting a decrease in the supply voltage and wherein modifying comprises increasing the slope in response thereto.

9. The method of claim 1, further comprising detecting an increase in the supply voltage and wherein modifying comprises decreasing the slope in response thereto.

10. The method of claim 1, wherein modifying is performed when the switched-mode power supply is in a low-power mode of operation.

11. The method of claim 10, wherein said low-power mode of operation is implemented by operating the switched-mode power supply in pulse-frequency modulation.

12. The method of claim 1, wherein modifying is performed when the switched-mode power supply is in a high-power mode of operation.

13. The method of claim 12, wherein said high-power mode of operation is implemented by operating the switched-mode power supply in pulse-width modulation.

* * * * *